United States Patent
De Bruijn et al.

(10) Patent No.: US 9,900,092 B2
(45) Date of Patent: Feb. 20, 2018

(54) MODULATION OF CODED LIGHT COMPONENTS

(71) Applicant: PHILIPS LIGHTING HOLDING B.V., Eindhoven (NL)

(72) Inventors: Frederik Jan De Bruijn, Eindhoven (NL); Stephanus Joseph Johannes Nijssen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/907,284

(22) PCT Filed: Jul. 16, 2014

(86) PCT No.: PCT/EP2014/065187
§ 371 (c)(1),
(2) Date: Jan. 24, 2016

(87) PCT Pub. No.: WO2015/010967
PCT Pub. Date: Jan. 29, 2015

(65) Prior Publication Data
US 2016/0164603 A1   Jun. 9, 2016

(30) Foreign Application Priority Data

Jul. 23, 2013 (EP) .................................... 13177566

(51) Int. Cl.
*H04B 10/00* (2013.01)
*H04B 10/116* (2013.01)
(Continued)

(52) U.S. Cl.
CPC ....... *H04B 10/116* (2013.01); *H04B 10/1149* (2013.01); *H05B 37/0272* (2013.01); *H04B 10/516* (2013.01)

(58) Field of Classification Search
None
See application file for complete search history.

(56) References Cited

U.S. PATENT DOCUMENTS 6,710,818 B1 * 3/2004 Kasahara ............... H04N 5/235
348/226.1
8,334,901 B1 * 12/2012 Ganick ..................... G01S 1/70
348/131

(Continued)

FOREIGN PATENT DOCUMENTS

EP           2503852 A1    9/2012
JP        2011078074 A1    4/2011

(Continued)

OTHER PUBLICATIONS

Mehdi, Von Neumann Architecture, http://www2.cs.siu.edu/~cs401/Textbook/ch2.pdf, 2012.*

(Continued)

*Primary Examiner* — Ken N Vanderpuye
*Assistant Examiner* — Jai Lee
(74) *Attorney, Agent, or Firm* — Meenakshy Chakravorty

(57) ABSTRACT

A coded light component is modulated into emitted light on one of multiple channels each having a different modulation frequency. Modulation in the light causes a receiving camera to experience an apparent temporal frequency due to sequential capture of multiple frames and an apparent spatial frequency due to sequential exposure of spatial portions within each frame. Each channel can be detected by a detection module of the camera based on a respective combination of values of the apparent temporal and spatial frequency corresponding to the respective modulation frequency. The detection module has a respective response on each channel that varies as a function of the apparent temporal frequency. The channel for modulating the coded light component is selected from amongst a predetermined (Continued)

set having a property that the response of the detection module on each channel will have a minimum substantially at the apparent temporal frequency of each other channel.

19 Claims, 15 Drawing Sheets

(51) Int. Cl.
*H04B 10/114* (2013.01)
*H05B 37/02* (2006.01)
*H04B 10/516* (2013.01)

(56) References Cited

U.S. PATENT DOCUMENTS

| | | | | |
|---|---|---|---|---|
| 8,879,735 | B2* | 11/2014 | Lord | H04L 63/0428 380/270 |
| 9,008,315 | B2* | 4/2015 | Lord | H04M 1/0264 380/270 |
| 2005/0190274 | A1* | 9/2005 | Yoshikawa | H04N 3/1562 348/231.99 |
| 2010/0172651 | A1 | 7/2010 | Nien et al. | |
| 2014/0184914 | A1* | 7/2014 | Oshima | H04N 5/445 348/564 |
| 2014/0205136 | A1* | 7/2014 | Oshima | G09G 3/20 382/100 |
| 2014/0241730 | A1* | 8/2014 | Jovicic | H04L 7/0075 398/118 |
| 2014/0265878 | A1* | 9/2014 | Gritti | H04B 10/116 315/153 |
| 2014/0314420 | A1* | 10/2014 | De Bruijn | H05B 37/0272 398/127 |
| 2014/0321859 | A1* | 10/2014 | Guo | H04B 10/116 398/118 |
| 2015/0249496 | A1* | 9/2015 | Muijs | H04B 10/116 398/118 |
| 2016/0112126 | A1* | 4/2016 | Nijssen | H04B 10/116 398/118 |

FOREIGN PATENT DOCUMENTS

| | | |
|---|---|---|
| WO | 2011086501 A1 | 7/2011 |
| WO | 2014037866 A1 | 3/2014 |

OTHER PUBLICATIONS

Sijbers, J., et al., "Maximum Likelihood Estimation of Signal Amplitude and Noise Variance From Mr Data," Magnetic Resonance in Medicine, 51:586-594 (2004) (9 pages).

* cited by examiner

MODULATION OF CODED LIGHT COMPONENTS

CROSS-REFERENCE TO PRIOR APPLICATIONS

This application is the U.S. National Phase application under 35 U.S.C. § 371 of International Application No. PCT/EP2014/065187, filed on Jul. 16, 2014, which claims the benefit of European Patent Application No. 13177566.0, filed on Jul. 23, 2013. These applications are hereby incorporated by reference herein.

TECHNICAL FIELD OF THE INVENTION

The present disclosure relates to the allocation of modulation frequencies for modulating coded light into the light emitted from one or more lighting devices.

BACKGROUND OF THE INVENTION

Coded light refers to techniques whereby a signal is embedded in the visible light emitted by a luminaire. The light thus comprises both a visible illumination contribution for illuminating a target environment such as room (typically the primary purpose of the light), and an embedded signal for providing information into the environment. To do this, the light is modulated at a certain modulation frequency or frequencies.

In some of the simplest cases, the signal may comprise a single waveform or even a single harmonic modulated into the light from a given luminaire. The light emitted by each of a plurality of luminaires may be modulated with a different respective modulation frequency that is unique amongst those luminaires, and the modulation frequency can then serve as an identifier of the luminaire or its light. For example this can be used in a commissioning phase to identify the contribution from each luminaire, or during operation can be used to identify a luminaire in order to control it. In another example, the identification can be used for navigation or other location-based functionality, by mapping the identifier to a known location of a luminaire or information associated with the location.

In other cases, a signal comprising more complex data may embedded in the light. For example using frequency keying, a given luminaire is operable to emit on two (or more) different modulation frequencies and to transmit data bits (or more generally symbols) by switching between the different modulation frequencies. If there are multiple such luminaires emitting in the same environment, each may be arranged to use a different respective plurality of frequencies to perform its respective keying.

Coded light can be detected using a normal "rolling shutter" type camera, as is often integrated into a mobile device like a mobile phone or tablet. In a rolling-shutter camera, the camera's image capture element is divided into a plurality of lines (typically horizontal lines, i.e. rows) which are exposed in sequence line-by-line. That is, to capture a given frame, first one line is first exposed to the light in the target environment, then the next line in the sequence is exposed at a slightly later time, and so forth. Typically the sequence "rolls" in order across the frame, e.g. in rows top to bottom, hence the name "rolling shutter". When used to capture coded light, this means different lines within a frame capture the light at different times and therefore, if the line rate is high enough relative to the modulation frequency, at different phases of the modulation waveform. Thus the modulation in the light can be detected.

EP 2,503,852 describes how rolling-shutter type techniques can be used not only to detect the identity or data signaled by the coded light component, but also the spatial footprint of an individual coded light component in the case where there are multiple coded light components present in the environment from different luminaires. That is, the magnitude of the individual component can be determined as a function of spatial coordinates within the captured image, e.g. as a function of Cartesian x and y pixel coordinates, separated from amongst the contribution from the other component or components. For example a commissioning technician need only point the camera of his or her device towards a scene in the target environment, and can thus determine the individual contribution from each luminaire.

SUMMARY OF THE INVENTION

Detecting information from a coded light component such as its spatial footprint involves the capture of the sequence of lines (or more generally spatial portions) over a plurality of frames. It would be desirable to be able to detect the coded light component within only a relatively small number of frames. According to the present disclosure, this can be achieved by arranging modulation frequencies to be selected from amongst an optimally separated set of predetermined frequencies, each defining a respective channel. Using a rolling-shutter process or the like, the camera will experience an apparent temporal frequency due to sequential capture of multiple frames and an apparent spatial frequency due to sequential exposure of spatial portions within each frame. A given modulation frequency corresponds to a respective combination of apparent spatial and temporal frequency that will be experienced by the camera. Further, the detection process will have a certain characteristic response on each channel. The response is a function of apparent temporal frequency, but the shape of the response is also partly an effect of the spatial frequency selectivity. This can be exploited by noting that the response on each channel will comprise a "blind spot" in the apparent temporal frequency domain, and arranging the modulation frequencies so that the apparent temporal frequency of one channel falls in a blind spot of another channel. Thus interference between channels can be reduced and a given coded light component distinguished in a relatively smaller number of frames than might otherwise have been required.

Hence according to one aspect disclosed herein, there is provided a transmitting apparatus comprising an output for controlling a light source to emit light, and a controller configured to modulate a coded light component into the light on a selected one of a plurality of channels each having a different respective modulation frequency. The controller is configured with said one of the channels being selected from amongst a predetermined set, having a property that the response of the detection module on each of said channels will have a minimum substantially at the apparent temporal frequency of each other of said channels.

In embodiments the apparatus may comprise outputs for controlling a plurality of lighting devices; and one or more controllers configured to modulate a respective coded light component into the light emitted from each of the light sources, each on a respective one of the predetermined set of channels each having a different respective modulation frequency.

In alternative or additional embodiments, the controller may be configured to modulate a plurality of coded light component into the light emitted from said light source, each on a respective one of the predetermined set of channels each having a different respective modulation frequency.

According to another aspect disclosed herein, there is provided a receiving device, comprising: an input for receiving image data from a camera, wherein modulation in the light will cause the camera to experience an apparent temporal frequency due to successive capture of multiple frames; and a detection module configured to detect coded light components modulated into the light on a plurality of respective channels each having a different respective modulation frequency, being configured to separate out each of the channels based on the apparent temporal. The camera may also experience an apparent spatial frequency due to sequential exposure of spatial portions within each frame, and the detection module may be configured to selectively receive each of the channels based on a respective combination of values of the apparent temporal and spatial frequency corresponding to the respective modulation frequency. On each of said channels, the detection module has a respective response that varies as a function of the apparent temporal frequency, and comprises an effect of the selective reception based on the apparent spatial frequency; and the response of the detection module on each of said channels has a minimum substantially at the apparent temporal frequency of each other of said channels.

According to a further aspect disclosed herein, there may be provided a system comprising the transmitting apparatus and receiving device. According to yet another aspect, there may be provided a computer program product embodied on a computer readable storage medium and configured so as when executed to perform operations of the transmitting apparatus and/or receiving device.

In embodiments, the response of the detection module may be dependent on a number of the sequentially captured frames over which the coded light component is detected, and the predetermined set may be arranged to have said property for said number of frames.

For example the modulation frequencies of the predetermined set may be configured substantially as:

$$f_c = \frac{k}{N} f_{frame}$$

where $f_c$ is the modulation frequency, $f_{frame}$ is a rate at which the frames are captured, N is the number of sequentially captured frames over which the coded light component is to be detected, and k is an integer other than N.

In further embodiments, the response may have a width $\Delta f_c^{(y)}$ in the domain of the apparent spatial frequency and a width $\Delta f_c^{(t)}$ in the domain of the apparent temporal frequency, and the modulation frequency on each channel may be separated from each other channel by at least $\Delta f_c^{(y)}$ in the apparent spatial frequency domain and $\Delta f_c^{(t)}$ in the apparent temporal frequency domain.

In further embodiments, the detection module may comprise a filter configured to select the apparent spatial frequency of the channel, and a temporal accumulation function arranged to select the apparent temporal frequency; where the response may comprise an effect of the filter and the temporal accumulation function.

For example said filter may comprise a Gabor filter $z_c(y, n)$ and the temporal accumulation function may be described by:

$$\hat{a}_c = |\Sigma_{n=1}^{N} z_c(y,n) e^{-i2\pi f_c^{(t)}(n-1)}|$$

where $\Delta f_c^{(t)}$ is the apparent temporal frequency and N is the number of sequentially captured frames over which the coded light component is to be detected.

In yet further embodiments, the detection module may be configured to detect the coded light component over a first group of N of said sequentially captured frames, and then to perform an updated instance of the detection over each of one or more further groups N of said sequentially captured frames, where the groups may overlap in time, containing some of the same frames.

BRIEF DESCRIPTION OF THE DRAWINGS

For a better understanding of embodiments disclosed herein and to show how they may be put into effect, reference is made by way of example to the accompanying drawings in which.

DETAILED DESCRIPTION OF EMBODIMENTS

Figure 1A:
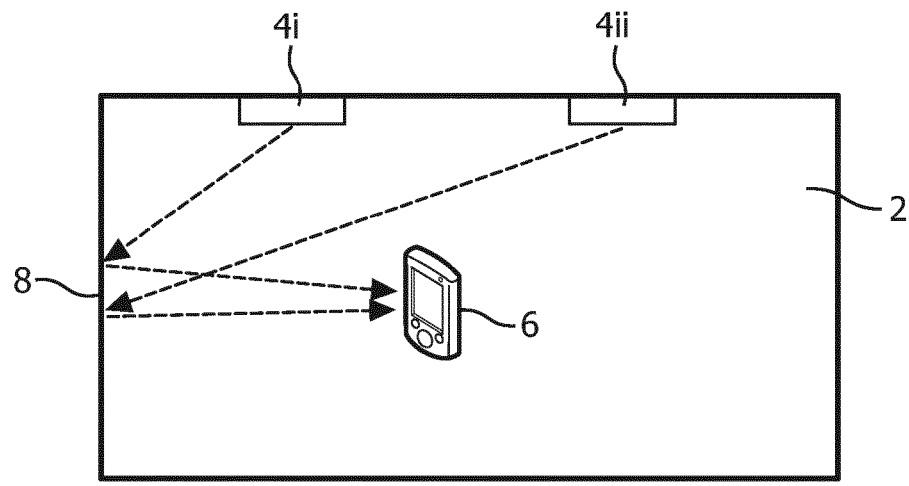
FIG. 1a schematically illustrates a space comprising a lighting system and camera.

FIG. 1a shows an example environment 2 in which embodiments disclosed herein may be deployed. For example the environment may comprise one or more rooms and/or corridors of an office, home, school, hospital, museum or other indoor space; or an outdoor space such as a park, street, stadium or such like; or another type of space such as a gazebo or the interior of a vehicle. The environment 2 is installed with a lighting system comprising one or more lighting devices 4 in the form of one or more luminaires. The one or more luminaires may also be referred to as lamps. Two luminaires 4*i* and 4*ii* are shown for illustrative purposes, but it will be appreciated that other numbers may be present. The luminaires may be implemented under central control or as separate, stand-alone units.

Figure 1B:
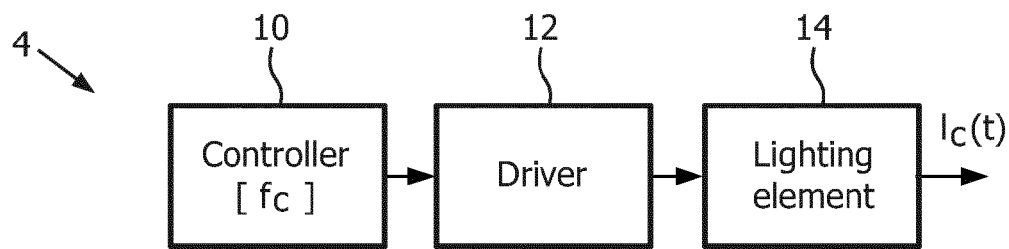
FIG. 1b is a schematic block diagram of an apparatus for transmitting coded light.

FIG. 1*b* gives a block diagram of a luminaire, e.g. of a form that may be used to implement each of the one or more luminaires 4. The luminaire 4 comprises a lighting element 14 such an LED, array of LEDs or filament bulb. The lighting element may also be referred to as a lamp or light source. The luminaire 4 also comprises a driver 12 coupled to the lighting element 14 and a controller 10 coupled to the driver 12. The controller 10 is configured to output a signal to the driver 12 in order to drive the lighting element 14 to emit a desired light output. The controller 10 may be implemented in the form of code stored on a computer readable storage medium or media and arranged to be executed on a processor comprising one or more processing units. Alternatively it is not excluded that some or all of the controller 10 is implemented in dedicated hardware circuitry or reconfigurable circuitry such as an FPGA. The controller 10 may be implemented locally at the luminaire 4 or at a central controller which may be shared with one or more other luminaires 4, or a combination of these. Generally the components 10, 12 and 14 may or may not be integrated into the same unit.

The controller 10 is configured to control the light emitted by the lighting element 14 to be modulated with a coded light component at a modulation frequency $f_c$. In embodiments there may be a plurality of luminaires 4*i*, 4*ii* in the same environment 2, each with a controller 10 configured to embed a different respective coded light component modulated at a respective modulation frequency $f_c$ into the light emitted from the respective lighting element 14. Alternatively or additionally, the controller 10 of a given luminaire 4 may be configured to embed two or more coded light components into the light emitted by that same luminaire's lighting element 14, each at a different respective modulation frequency, e.g. to enable that luminaire to use frequency keying to embed data. It is also possible that two or more luminaires 4 in the same environment 2 each emit light modulated with two or more respective coded light components all at different respective modulation frequencies. I.e. so a first luminaire 4*i* may emit a first plurality of coded light components at a plurality of respective modulation frequencies, and a second luminaire 4*ii* may emit a second, different plurality of coded light components modulated at a second, different plurality of respective modulation frequencies.

In any of these embodiments, there are liable to be multiple code light components in the same environment 2. The modulation frequencies are selected from amongst a predetermined set of discrete modulation frequencies which in accordance with embodiments described below are allocated so as to have an optimal separation. In embodiments this may mean the modulation frequencies of each luminaire 4 are pre-selected and the controller(s) 10 pre-configured with the frequencies. It does not necessarily mean the controller 10 has to determine the frequency ad-hoc, though that is not excluded. In the case of a plurality of luminaires 4, each is arranged to emit light modulated at a different respective modulation frequency. In this sense at least the plurality of luminaires 4 may be described as forming a lighting system. It will be appreciated however this does not necessarily imply any form of central control or communication between luminaires. In embodiments the controller 10 of each luminaire 4 may be pre-configured with the relevant frequency. Alternatively the frequencies could be allocated from a central controller, or the controllers of individual luminaires may be arranged to communicate between one another to negotiate there different frequencies in a distributed fashion (e.g. when a new luminaire is installed it queries one or more existing others to determine which frequencies are already in use, and then selects one of the set that is not already taken).

Also present in the environment 2 is a user terminal 6, preferably a mobile device such as a smart phone or tablet.

Figure 1C:
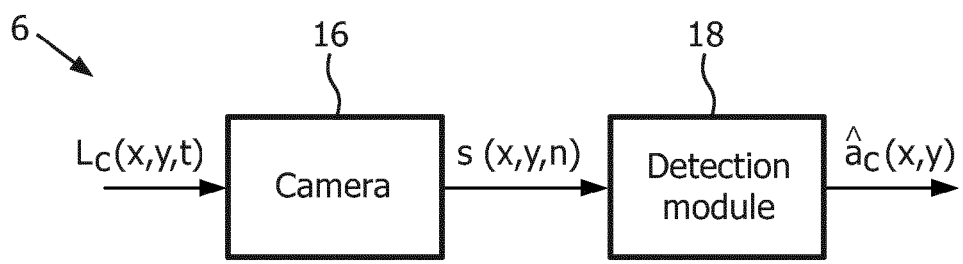
FIG. 1c is a schematic block diagram of a device with camera for receiving coded light, FIG. 1d schematically illustrates an image capture element of a rolling-shutter camera, FIG. 1e schematically illustrates the capture of modulated light by rolling shutter.

FIG. 1*c* gives a block diagram of the mobile device 6. The device 6 comprises a camera having a two-dimensional image capture element 20, and a detection module 18 coupled to the image capture element. The detection module 18 is configured to process signals representing images captured by the image capture element and detecting coded light components in the light from which the image was captured. The detection module 18 may be implemented in the form of code stored on a computer readable storage medium or media and arranged to be executed on a processor comprising one or more processing units. Alternatively it is not excluded that some or all of the detection module 18 is implemented in dedicated hardware circuitry or reconfigurable circuitry such as an FPGA. Generally the components 16 and 18 may or may not be integrated into the same unit.

The one or more luminaires 4 are configured to emit light into the environment 2 and thereby illuminate at least part of that environment. A user of the mobile device 6 is able to direct the camera 16 of the device towards a scene 8 in the environment 2 from which light is reflected. For example the scene could comprise a surface such as a wall and/or other objects. Light emitted by the one or more luminaires 4 is reflected from the scene onto the two-dimensional image capture element of the camera, which thereby captures a two dimensional image of the scene 8.

Figure 1D:
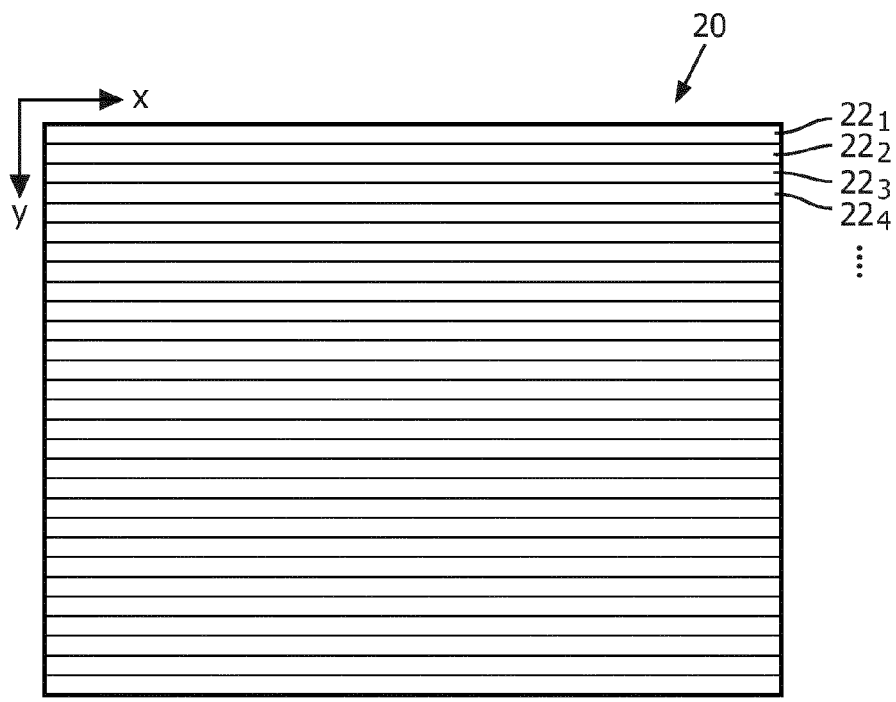
FIG. 1f is an example timing diagram of a rolling-shutter capture process, FIG. 2 schematically illustrates an image and column stack captured over time.

FIG. 1*d* represents the image capture element 20 of the camera 16. The image capture element 20 comprises an array of pixels for capturing signals representative of light incident on each pixel, e.g. typically a square or rectangular array of square or rectangular pixels which may be addressed in terms of Cartesian type x and y coordinates. In a rolling-shutter camera, the pixels are arranged into a plurality of lines, e.g. horizontal rows 22. To capture a frame each line is exposed in sequence, each for a certain exposure time $T_{exp}$. For example first the top row $22_1$ is exposed for time $T_{exp}$, then at a slightly later time the second row down $22_2$ is exposed for $T_{exp}$, then at a slightly later time again the third row down $22_3$ is exposed for $T_{exp}$, and so forth until the bottom row has been exposed. This process is then repeated to expose a sequence of frames.

In EP 2,503,852 for example, it has been described how coded light can be detected using a conventional video camera of this type. The signal detection exploits the rolling shutter image capture, which causes temporal light modulations to translate to spatial intensity variations over successive image rows.

Figure 1E:
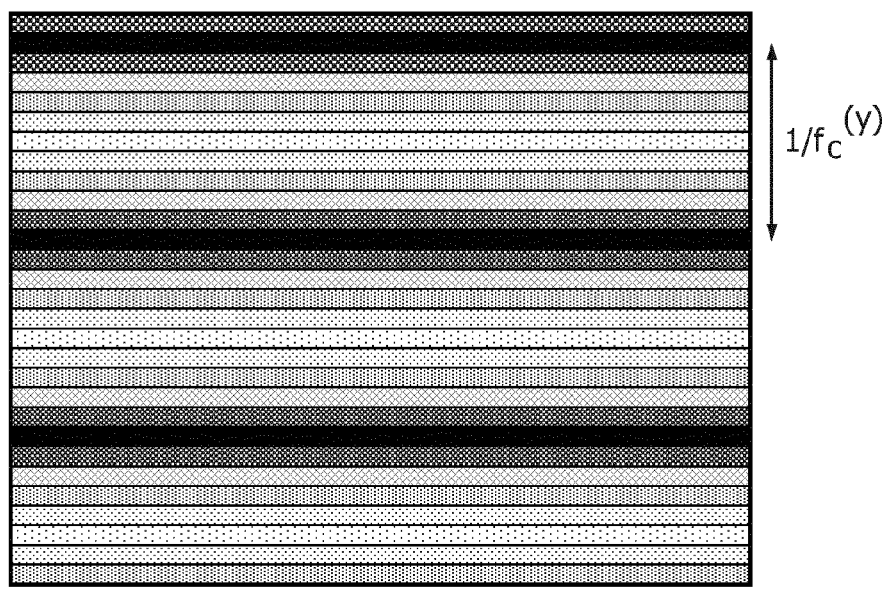

This is illustrated schematically FIG. 1*e*. As each successive line 22 is exposed, it is exposed at a slightly different time and therefore (if the line rate is high enough compared to the modulation frequency) at a slightly different phase of the modulation. Thus each line 22 is exposed to a respective instantaneous level of the modulated light. This results in a pattern of stripes which undulates or cycles with the modulation over a given frame.

Moreover, coded light signals with a repetitive nature appear with a different spatial shift in successive image frames. In case the consecutive frames are captured at equal time intervals the spatial pattern can adopt an apparent crawling upward or downward motion.

In an environment where multiple coded light components are present, each on a different modulation frequency, the effect described above allows detection of a separate spatial footprint of each coded light component. That is, it is possible to extract a version of the two-dimensional captured image that is just due to the light from an individual one of the coded light components—i.e. an image of the scene 8 as if only illuminated by that coded light component, with the effect of the other components removed. This can be done individually for each of the different coded light components present, thus producing a plurality of spatial foot prints each for a respective one of the coded light components. For example, where the different components are emitted by different luminaires 4, the technique may be used by a commissioning technician to determine the individual contributions from each of the luminaires 4 in a given environment 2. Alternatively the technique may be used determine which signal or data is coming from where, e.g. to facilitate in applications such as indoor or outdoor navigation or providing location based services.

The detection will benefit from a specific choice of frequencies in order to optimally separate individual lamp signals from each other and from the background. The present disclosure describes the selection of substantially optimal modulation frequencies that allow detection over a potentially very small numbers of frames, which is of high practical relevance to a variety of coded light applications.

Although the invention is not confined to the detection of harmonic signals, the example of single-frequency harmonic signals is described below to facilitate explanation.

Figure 1F:
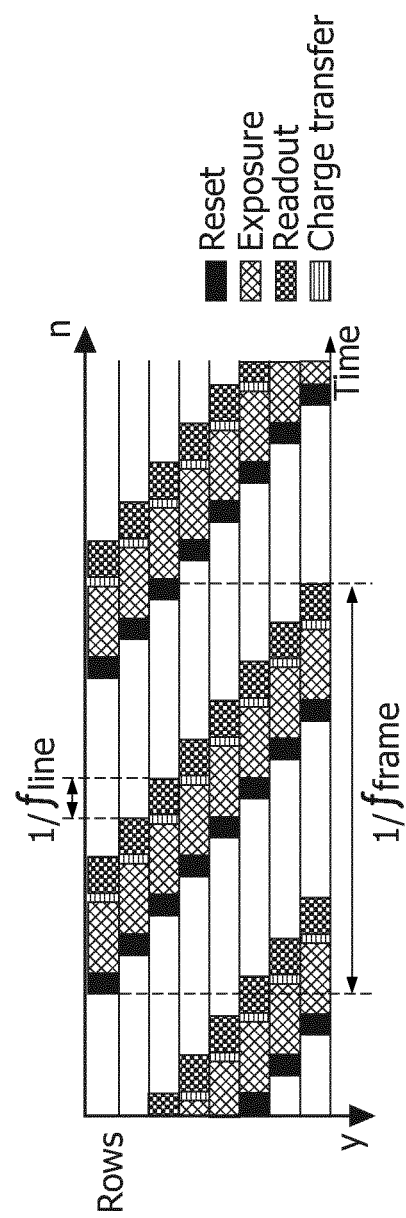

Rolling-shutter image-capture is typically based on the shared use of a single readout circuit for all sensor rows in a consecutive fashion. The line-readout time determines the time delay between consecutive lines and is a constant time interval $T_{line}$ [s]. As the exposure time for all lines is generally the same, each exposure period starts with the same delay as indicated in FIG. 1f. FIG. 1f shows a typical rolling shutter time diagram during continuous video capture mode.

The rolling-shutter capture of the sensor provides a mechanism to distinguish temporal light variations far beyond the frame rate of the camera. Where the video frame rate is typically within a range of 25 to 60 Hz, the line readout frequency is typically higher than 10,000 Hz. Interestingly, rolling shutter acquisition represents a form of spatiotemporal sampling in which the temporal dimension is (partially) sampled along the vertical dimension. As such, there exists a relation between the time t and the vertical (line) position y:

$$t(y, n) = \frac{y}{f_{line}} + \frac{n}{f_{frame}} \quad (1)$$

where $f_{frame}$ denotes the frame rate, and n=0, 1, 2, 3 . . . is a frame index.

A modulation frequency $f_c$ [Hz], due to a certain light source indexed by c, maps to an apparent spatial frequency $f_c^{(y)}$:

$$f_c^{(y)} = \frac{f_c}{f_{line}} \text{[cycles/line]}. \quad (2)$$

The apparent spatial frequency causes a pattern of horizontal stripes to appear in a captured image of which the pitch is determined by $f_c^{(y)}$.

When, instead of a single image, a temporal image sequence is captured of a modulating light source, then given a frame rate $f_{frame}$ [Hz] (i.e. frames/s), the physical modulation frequency causes the light phenomenon to adopt an apparent temporal frequency:

$$f_c^{(t)} = \frac{f_c}{f_{frame}} \text{[cycles/frame]} \quad (3)$$

As the adjacent pixels on each captured row share the same time instance, the analysis can be confined to a single column, and the signal followed over time. The stack of columns forms a 2D signal which can be regarded as an image in itself.

Figure 2:
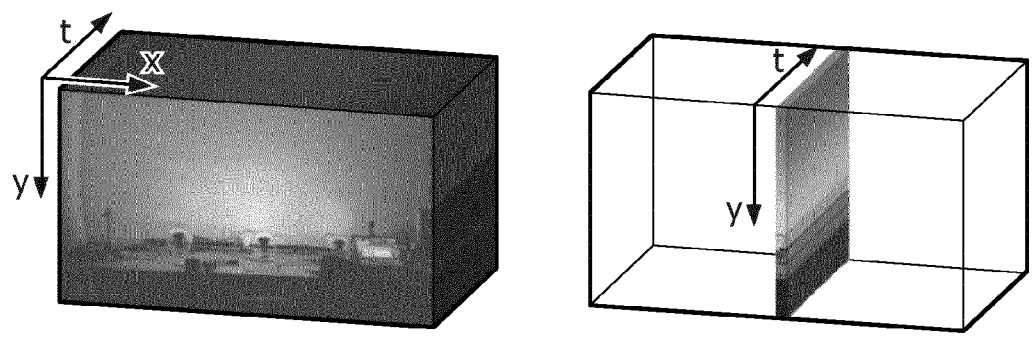
Figure 3:
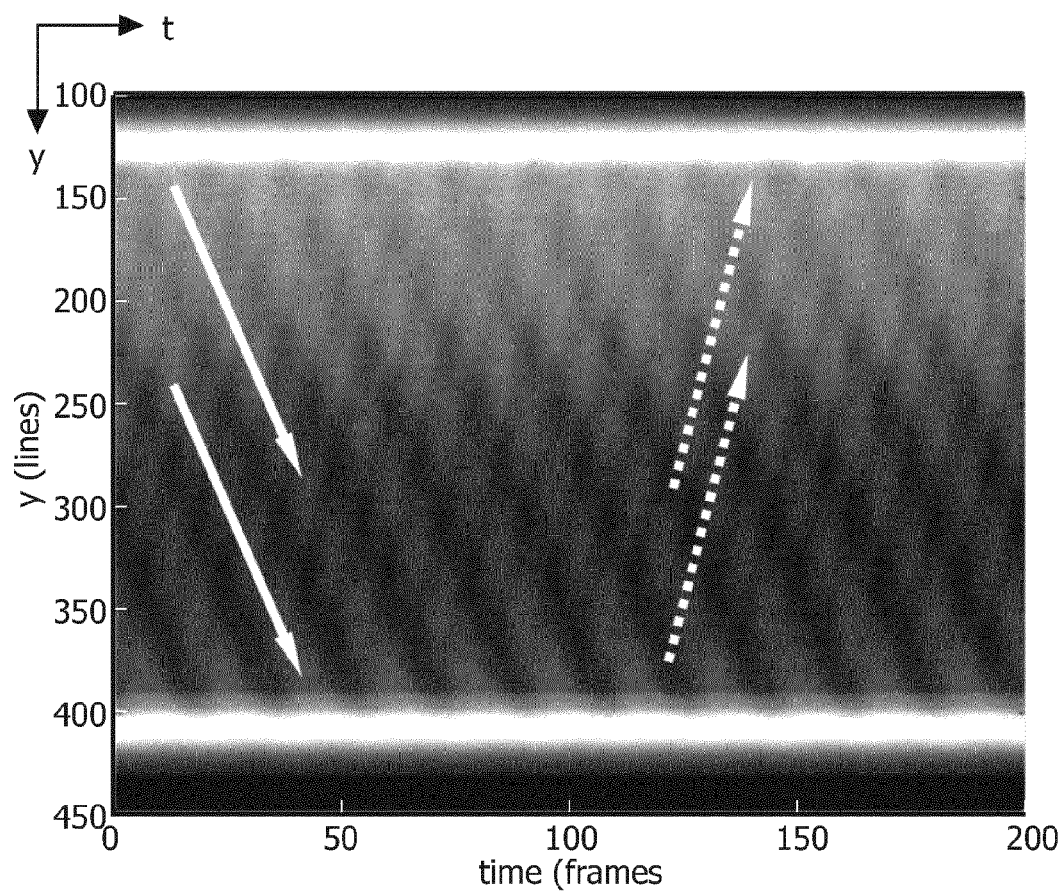
FIG. 3 shows an example fragment of a temporal column stack.

In absence of motion, background objects cause a pixel value that repeats along the time direction. In case a lamp causes a crawling stripe pattern in the image stack, the column stack adopts a slanted pattern of stripes as depicted in FIG. 2 and FIG. 3.

Consider a single harmonic coded light intensity signal $I_c(t)$ [W/sr] from a luminaire c, consisting of a DC component of amplitude $I_{DC,c}$ and an AC component of amplitude $I_{AC,c}$ modulated at physical (temporal) frequency $f_c$ [Hz] selected out of a predefined set of known frequencies; in complex notation:

$$I_c(t) = I_{DC,c} + I_{AC,c} e^{-i2\pi f_c t} \text{ [W/sr]}. \quad (4)$$

When this light source illuminates a scene, the radiance from a surface element of the scene follows from a multiplicative process, causing the scene to radiate light back into the world with a radiance $L_c$ [W/(m²sr)], which is the result of the local light interaction (absorption and reflection). A camera captures this radiant light field creating an image $L_c(x,y,t)$:

$$L_c(x,y,t) = B_c(x,y) + A e^{-i2\pi f_c t} \text{[W/(m²sr)]}. \quad (5)$$

In the context of coded light detection, for a static geometry of scene objects, light sources and observer (the camera), and in absence of any other illumination, the relationship between light intensity $I_c(t)$ and the observed radiance distribution $L_c(x,y,t)$ is fully linear.

Now consider a general situation where the camera captures a scene that illuminated by multiple coded light sources. This results in an image sequence that can be represented by a spatiotemporal signal s(x,y,n), composed of the sum of $N_c$ coded light sources, each modulated at a unique physical frequency:

$$s(x, y, n) = b_{amb} + \sum_{c=1}^{N_c} \left[ b_c(x, y) + a_c(x, y) e^{-i\left(2\pi \frac{f_c}{f_{line}} y + 2\pi \frac{f_c}{f_{frame}} n\right)} \right], \quad (6)$$

$$= b(x, y) + \sum_{c=1}^{N_c} \left[ a_c(x, y) e^{-i\left(2\pi f_c^{(y)} y + 2\pi f_c^{(t)} n\right)} \right].$$

In the above, $b_{amb}(x,y)$ represents the signal generated by reflections of (non-coded) static ambient illumination off the scene, respectively. The coded-lamp-specific DC contributions $b_c(x,y)$, essentially the projections of each light footprint in the image plane, do not vary as a function of time and can therefore be treated as time-invariant ambient light.

The newly introduced compound background signal b(x,y) therefore holds the sum of all lamp specific and 'independent' DC components:

$$b(x,y)=b_{amb}(x,y)+\Sigma_{c=1}^{Nc}b_c(x,y). \quad (7)$$

Note that the modulation amplitudes $a_c(x,y)$ as well as the compound background component b(x,y) generally vary over space, as these depend on the geometry and reflective properties of the scene.

The left hand side of FIG. 2 depicts a video signal s(x,y,t) (=s(x,y,n) when written as a function of integer frame index n). The right hand side depicts a column stack s(y,t) (=s(y,n)).

FIG. 3 depicts a fragment of the temporal stack of columns s(y,t) (=s(y,n)) that are isolated in FIG. 2. The frequencies have been chosen such that they always exhibit a distinct apparent crawling motion. The conditions to attain this crawl will be explained shortly.

As shown in FIG. 3, the crawling of the spatial pattern over consecutive frames causes a sheared modulation pattern with a very distinct orientation (indicated by the solid arrows). In fact, a second pattern is also visible (indicated by the dotted arrows) which is associated with the overlapping footprint from a neighboring lamp.

The following regards the estimation of the lamp-specific spatial distribution of the coded light over the image. The above analysis shows that the appearance of this so-called light footprint in the image is proportional to the local amplitude of the light modulation within the image frame. As such the task of recovering the individual light footprints boils down to the task of estimating the amplitude distribution $â_c(x,y)$ for the different lamp frequencies $f_c$ from the input signal s(x,y,n).

The 2D Fourier transform of the column stack s(y,t) forms a 2D frequency domain of apparent frequencies. When the locus of the apparent frequencies $(f_c^{(y)}, f_c^{(t)})$ is plotted in the spatiotemporal Fourier plane as a function of the real, physical frequency $f_c$, it can be seen that it follows a distinct linear trace that wraps around due to aliasing.

This is due to the fact that in practice, the frame rate $f_{frame}$ is much lower than the frequencies $f_c$ that modulate the light. As a consequence, the apparent temporal frequency $f_c^{(t)}$ is always lower than half the frame rate:

$$f_c^{(t)} = \left[\left(\frac{f_c}{f_{frame}} + \frac{1}{2}\right) \text{mod} 1\right] - \frac{1}{2} \text{[cycles/frame]}, \quad (8)$$

where the mod operator is the modulo operator 1 (the modulo operator is the remainder of the division—it can be calculated using the 'floor' operator, using the expression x mod y=x−y[x/y]). Note that, as a consequence, the apparent temporal frequency 'wraps around' between the limits $-\frac{1}{2} < f_c^{(t)} < \frac{1}{2}$ for increasing physical modulation frequency $f_c$. A given value of line rate and frame rate causes the apparent spatial and temporal frequencies to be coupled for each physical modulation frequency.

Figure 4:
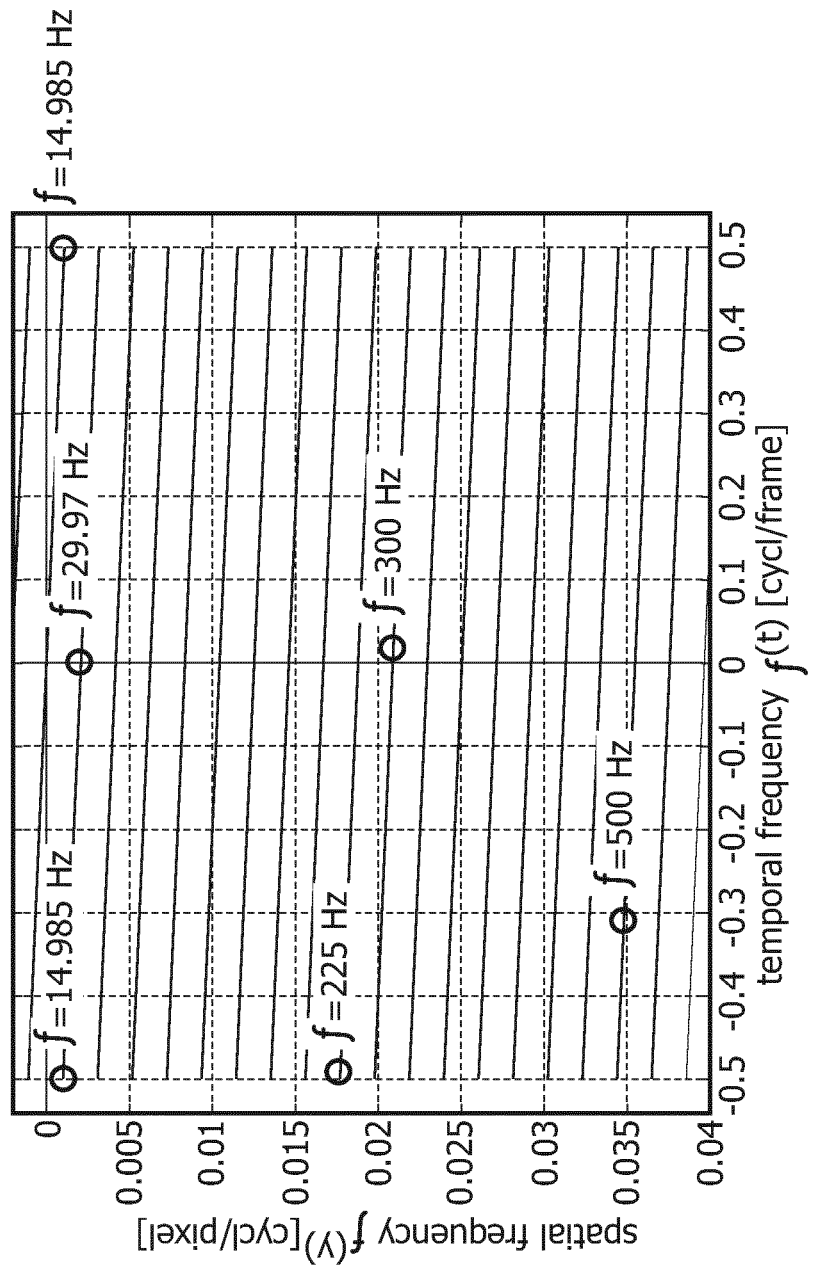
FIG. 4 shows an example frequency domain transform of a column stack.

In FIG. 4, a spatiotemporal Fourier domain is shown only for positive spatial frequencies, and shows the trace of only one of the two conjugate distributions. The line depicts the trace of apparent spatiotemporal frequencies for a physical modulation frequency between 0 and approximately 575 Hz. Note that the spatial frequency axis is magnified to reveal the warping of the trace due to aliasing with the relatively low frame-rate.

FIG. 4 shows the trace of apparent frequencies in the spatiotemporal Fourier plane (only half the domain is depicted here). Note that also here, in accordance with the direction of the positive y-axis, the positive $f_c^{(y)}$ axis is pointing down. In this example, the trace is plotted for a physical frequency between $0 < f_c < 575$ [Hz], for $f_{frame}=29.97$ [Hz] and $f_{line}=14386$ [Hz]. The upper five circles at 14.985 Hz, 29.97 Hz, 225 Hz and 300 Hz indicate example locations of unsuitable frequencies for detection. The lower circle at 500 Hz illustrates an example of a suitable frequency as it causes a spatial pattern that also exhibits apparent motion.

The values of the frame rate and line rate are common numbers for a standard VGA camera sensor (640×480@29.97 fps). The positive and negative values of the apparent temporal frequency are associated with an upward or downward crawling velocity of the spatial pattern respectively.

A physical frequency of f=300 Hz, being close to a multiple of the frame rate $f_{frame} \approx 30$ Hz, maps to frequency near the $f^{(y)}$ axis and creates a pattern that crawls very slowly in an upward direction over successive frames. A frequency further away from a multiple of the frame rate, e.g. f=500 Hz, crawls with a higher velocity, but in an upward direction as it maps to a negative apparent temporal frequency $f^{(t)}$.

The present disclosure regards the selection of the lamp specific modulation frequencies with regard to a substantially optimal detection given the number of captured video frames. The recovery of the spatial footprint can be implemented as an amplitude detection, where for each lamp, the spatiotemporal frequency $(f_c^{(y)}, f_c^{(t)})$ forms a carrier frequency around which the footprint-specific Fourier transform can be found.

Figure 5:
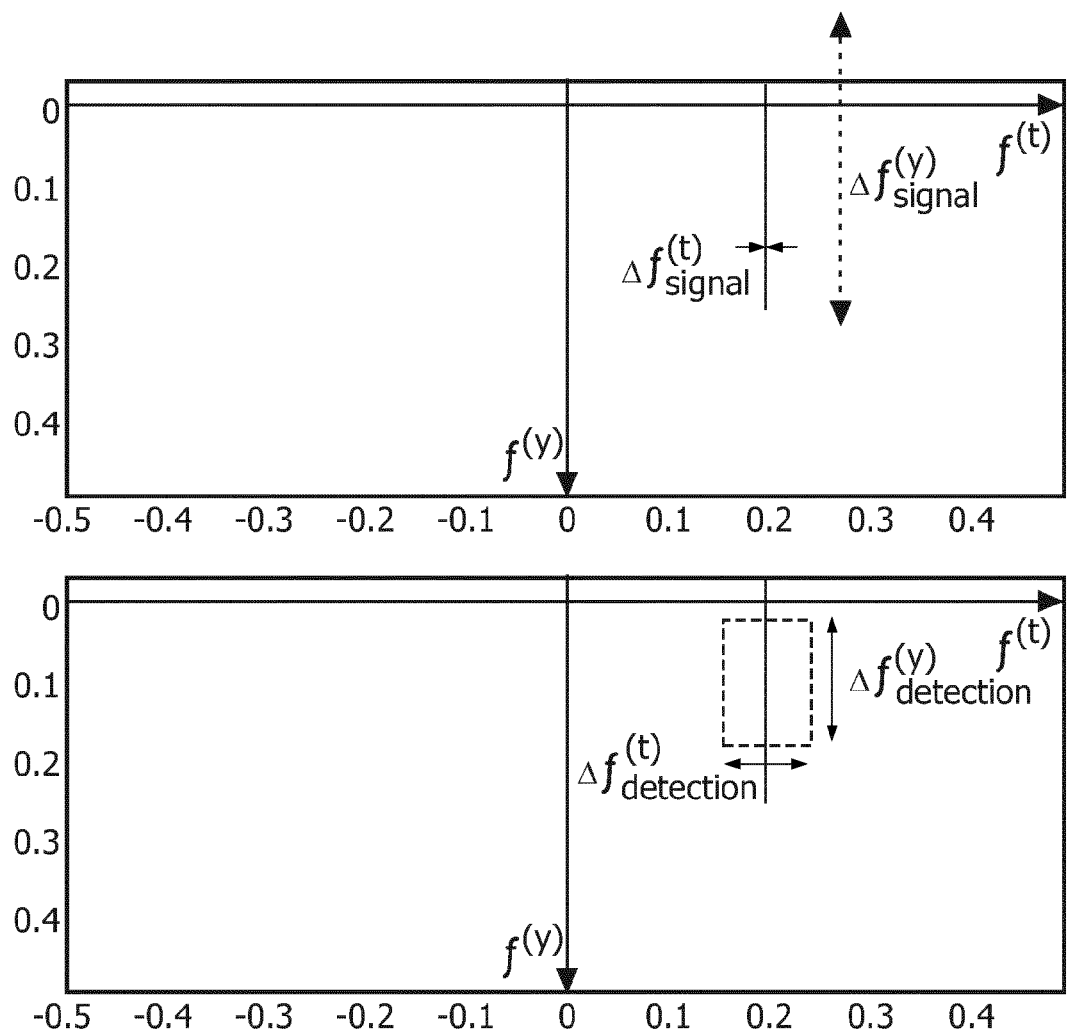
FIG. 5 shows the signal energy of an example column stack in the frequency domain.

In absence of object or camera motion the footprint $a_c(x,y)$ is time invariant. As a consequence, the associated frequency components only tend to spread along the direction of the spatial-frequency axis $f^{(y)}$ and not along the direction of the temporal frequency axis $f^{(t)}$. This is shown in FIG. 5 which depicts the distribution of the lamp signal energy in the domain of apparent spatiotemporal frequencies. The depicted signal spectrum is based on a DFT of simulated signal and based on an acquisition over 500 frames; consequently it approximates the continuous Fourier transform.

The spectral spread of the signal in the (vertical) direction of the $f^{(y)}$-axis can be characterized by a spatial-frequency bandwidth $\Delta f^{(y)}_{signal}$ that is associated with the input signal. In practice, the spatial-frequency bandwidth is only bounded by the vertical resolution of the input images. It can occupy the entire spectrum, but always tends to be peaking around the apparent spatial modulation frequency of associated lamp $f_c^{(t)}$.

The spectral spread of the signal in the (horizontal) direction of the $f^{(t)}$-axis can be characterized by an apparent temporal-frequency bandwidth $\Delta f^{(t)}_{signal}$. In absence of motion, $\Delta f^{(t)}_{signal} \to 0$, confining the lamp signal energy to a Dirac distribution around the apparent temporal modulation frequency of the associated lamp $f_c^{(t)}$.

The spatial-frequency selectivity of the signal detection $\Delta f^{(y)}_{signal}$ determines the vertical spatial resolution with which the light footprint estimate $â_c(x,y)$ is calculated. In the example implementation, detection filters with a Gaussian response are used, based on Gabor filters.

The temporal-frequency selectivity of the signal detection $\Delta f^{(y)}_{signal}$ dependents on the number of frames included in the determination of $â_c(x,y)$. The signal detection is based on a phase-corrected accumulation of the detected signal across the frame stack.

FIG. 5 shows an example of a two-dimensional discrete Fourier transform of column stack s(y,t). Depicted is the magnitude $|S(f^{(y)}, f^{(t)})|$ (for visibility, the logarithm of the magnitude is shown). The spatiotemporal 'wave' pattern is found back as isolated distributions, separated from the central distribution along the $f^{(t)}$-line. Note that, in accordance with the direction of the positive y-axis, also here the positive $f^{(y)}$ axis is pointing down. The top figure shows the signal bandwidth, and the bottom shows the bandwidth of detection bands.

The spatial-frequency detection and associated selectivity can be based on Gabor filters. The use of spatial-frequency selective filters allows subdivision of the spatiotemporal domain into multiple separate detection bands in the direction of the spatial frequency axis. The more separable detection bands, the more different lamp frequencies can be distinguished.

A Gabor filter is performed as a spatial convolution of input column stack s(y,n) with a complex kernel $h_c(y)$ associated with lamp frequency, and producing a new complex-valued column stack $z_c(y,n)$.

$$z_c(y,n) = s(y,n) * h_c(y) \qquad (9)$$

The Gabor filter kernel itself is the product of a Gaussian window and a complex harmonic signal:

$$h_c(y) = \frac{\exp\left(\frac{-y^2}{2\sigma_{spat}^2}\right)}{\sqrt{2\pi\sigma_{spat}^2}} \exp(i2\pi f_c^{(y)} y). \qquad (10)$$

The parameter $\sigma_{spat}$ determines the spatial spread of the kernel, and in order to guarantee sufficient attenuation at the start and end of the kernel, the number of taps of the filter is chosen according to:

$$N_{Gabor} = 6\sigma_{spat} \qquad (11)$$

Figure 6:
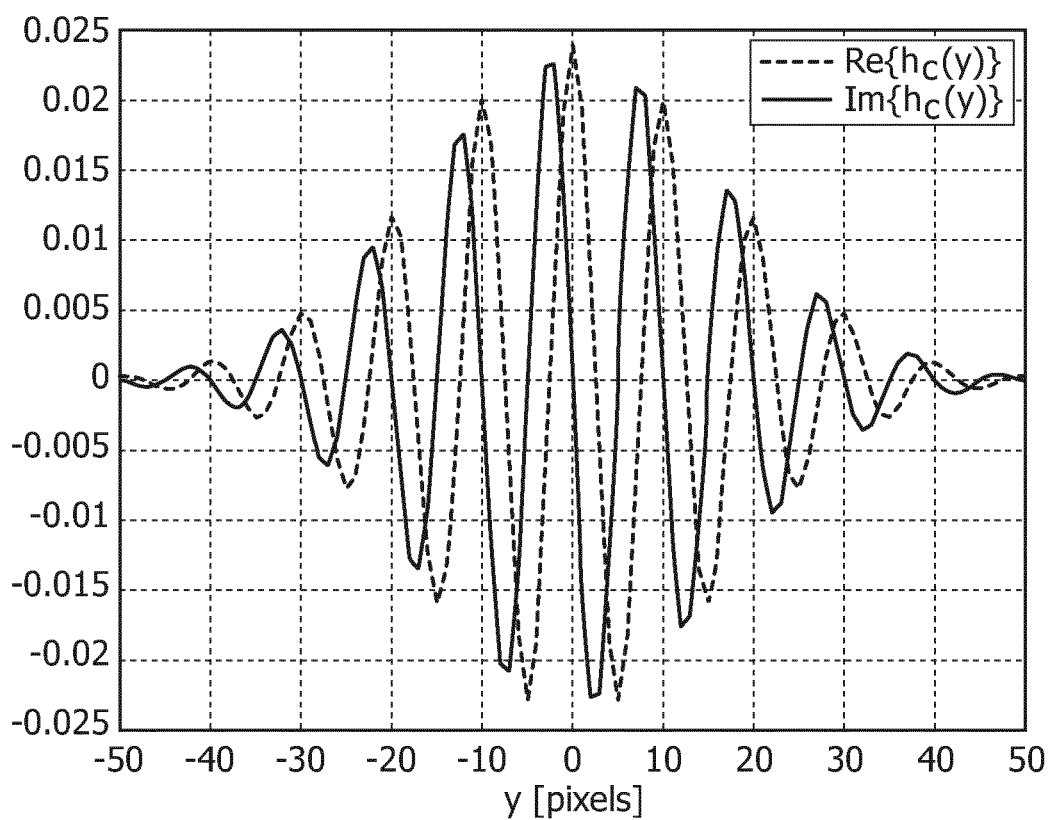
FIG. 6 shows an example of a Gabor filter kernel.

An example of a typical Gabor filter kernel is shown in FIG. 6. This shows an example of a Gabor filter kernel with a length of $N_{Gabor}=101$ taps, and 'tuned' to a frequency of $f_c^{(y)}=0.1$ cycles/pixel.

The magnitude response of the Gabor filter around $f_c^{(y)}$ [cycles/pixel] follows from and also adopts a Gaussian shape:

$$|H_c(f^{(y)})| = \exp\left[-\left(\frac{2\pi(f^{(y)} - f_c^{(y)})}{\sqrt{2}\,\sigma_{freq}}\right)^2\right], \qquad (12)$$

where parameter $\sigma_{freq}=(\sigma_{spat})^{-1}$ determines the spatial-frequency bandwidth. As the Gaussian spatial-frequency characteristic is theoretically unbounded, its bandwidth can be described at 50% transmission (the traditional 3 dB bandwidth) as well as at 90% transmission:

$$\Delta f_{detection,50\%}^{(y)} = \frac{\sigma_{freq}\sqrt{-2\ln 0.5}}{\pi} \approx 0.3748 \sigma_{frequ}[\text{cycles/pixel}], \qquad (13)$$

and $$\Delta f_{detection,90\%}^{(y)} = \frac{\sigma_{freq}\sqrt{-2\ln 0.9}}{\pi} \approx 0.1461 \sigma_{frequ}[\text{cycles/pixel}], \qquad (14)$$

respectively. The motivation for the use of the 90% transmission bandwidth is that channel separation for detection can often be smaller than the traditional 3 dB bandwidth.

Figure 7:
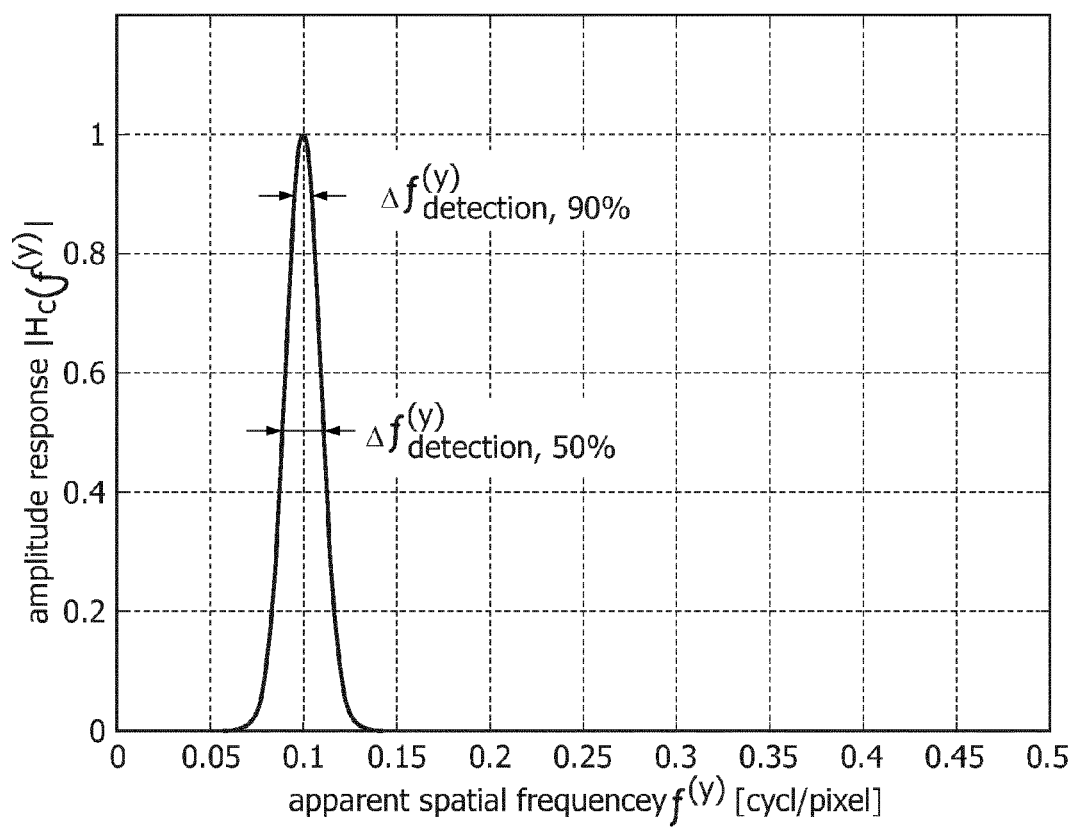
FIG. 7 shows an example of a Gabor filter magnitude response.

FIG. 7 shows the magnitude response of the example Gabor filter depicted in FIG. 6.

The temporal-frequency selectivity is determined by the frequency detection along the time axis. For fast detection, it is desirable to keep the number of frames that is used in the calculation as small as possible. The following gives a memory efficient calculation on the basis of a phase-corrected summation over the consecutive frames. When this operation is applied on the complex-valued signal that is produced by the Gabor filter, an instant estimate of the local amplitude at each pixel is obtained:

$$\hat{a}_c(y) = |\Sigma_{n=1}^{N_{frames}} z_c(y,n) e^{-i2\pi f_c^{(t)}(n-1)}| \qquad (15)$$

For every next frame n, the multiplication with the term $e^{-i2\pi f_c^{(t)}(n-1)}$ 'rewinds' the phase of $z_c(y,n)$ before summation. In case at pixel location y, the Gabor output $z_c(y,n)$ contains a temporal signal at this specific frequency, the calculation of $\hat{a}_c(y)$ follows from a summation over 'coherent' values that are expected to all have the same phase. The exact value of the common phase is not known, but also not relevant.

Given the situation of a common, but unknown value of the phase, it can be proven that the phase corrected summation according to expression (15) is in fact the maximum likelihood estimate of $\hat{a}_c(y)$, the magnitude of the modulated lamp signal as it was captured by the camera at pixel y.

The magnitude response of expression (15) is given by:

$$|H_c(f^{(t)})| = \frac{1}{N_{frames}} \left| \frac{1 - \exp(i2\pi N_{frames}(f_c^{(t)} - f^{(t)}))}{1 - \exp(i2\pi(f_c^{(t)} - f^{(t)}))} \right|, \qquad (16)$$

where $f_c^{(t)}$ is the apparent temporal frequency of lamp c, around which the channel is centered. The associated cutoff frequencies are only a function of the number of frames $N_{frames}$ and can be approximated by:

$$\Delta f_{detection,50\%}^{(t)} \approx \frac{1}{1.6701 N_{frames} - 0.2802}[\text{cycles/frame}], \qquad (17)$$

and $$\Delta f_{detection,90\%}^{(t)} \approx \frac{1}{4.1836 N_{frames} - 1.7352}[\text{cycles/frame}], \qquad (18)$$

respectively.

Figure 8:
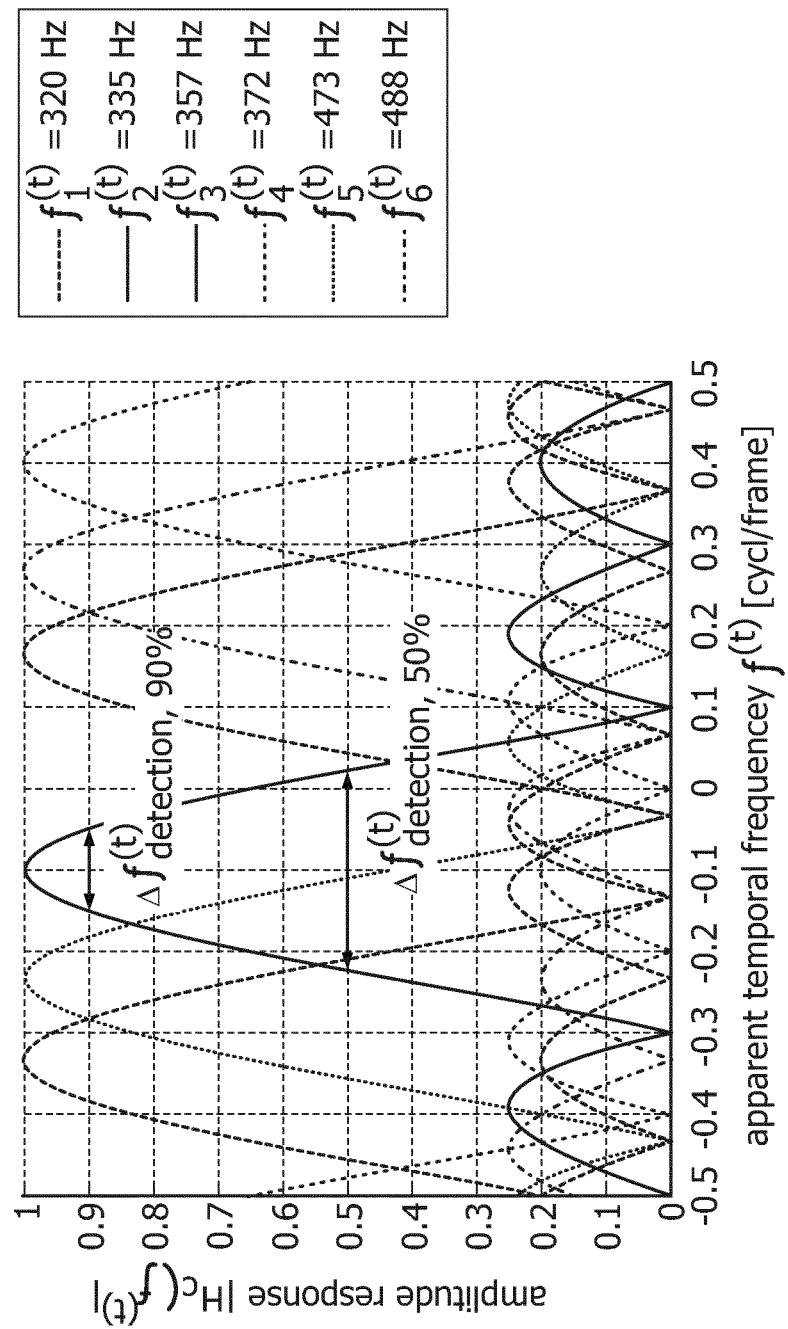
FIG. 8 shows an example magnitude response of a detection module.

Given a set of six different lamp frequencies the magnitude response of the temporal frequency detection is depicted in FIG. 8. This shows an example of temporal subband responses according to expression (16) for a frame rate $f_{frame}=30$ Hz, based on the calculation over $N_{frames}=5$ consecutive frames. The curve with the leftmost peak has $f_1^{(t)}=320$ Hz. The curve with the next leftmost peak has $f_5^{(t)}=473$ Hz. The curve with the next leftmost after than has $f_3^{(t)}=357$ Hz. The curve with the third peak from the right, the first of the next cluster, has $f_2^{(t)}=335$ Hz. The curve with the second peak from the right has $f_6^{(t)}=488$ Hz. The curve with the rightmost peak has $f_4^{(t)}=372$ Hz.

The phase corrected accumulation according to expression (15) allows the subband response to be centered at any arbitrary apparent temporal frequency, which in embodiments may be necessary as lamp frequencies may only be produced at a limited set of frequencies. E.g. the producible lamp frequencies are often confined to integer values.

This particularly becomes relevant in case many frames are incorporated in the amplitude estimation. In that case, the detection bandwidths become very small. Instead, the present disclosure is aimed at using very small numbers of frames in lamp-signal detection. Then, the bandwidths are relatively broad such detection selectivity becomes more difficult to achieve.

Figure 9:
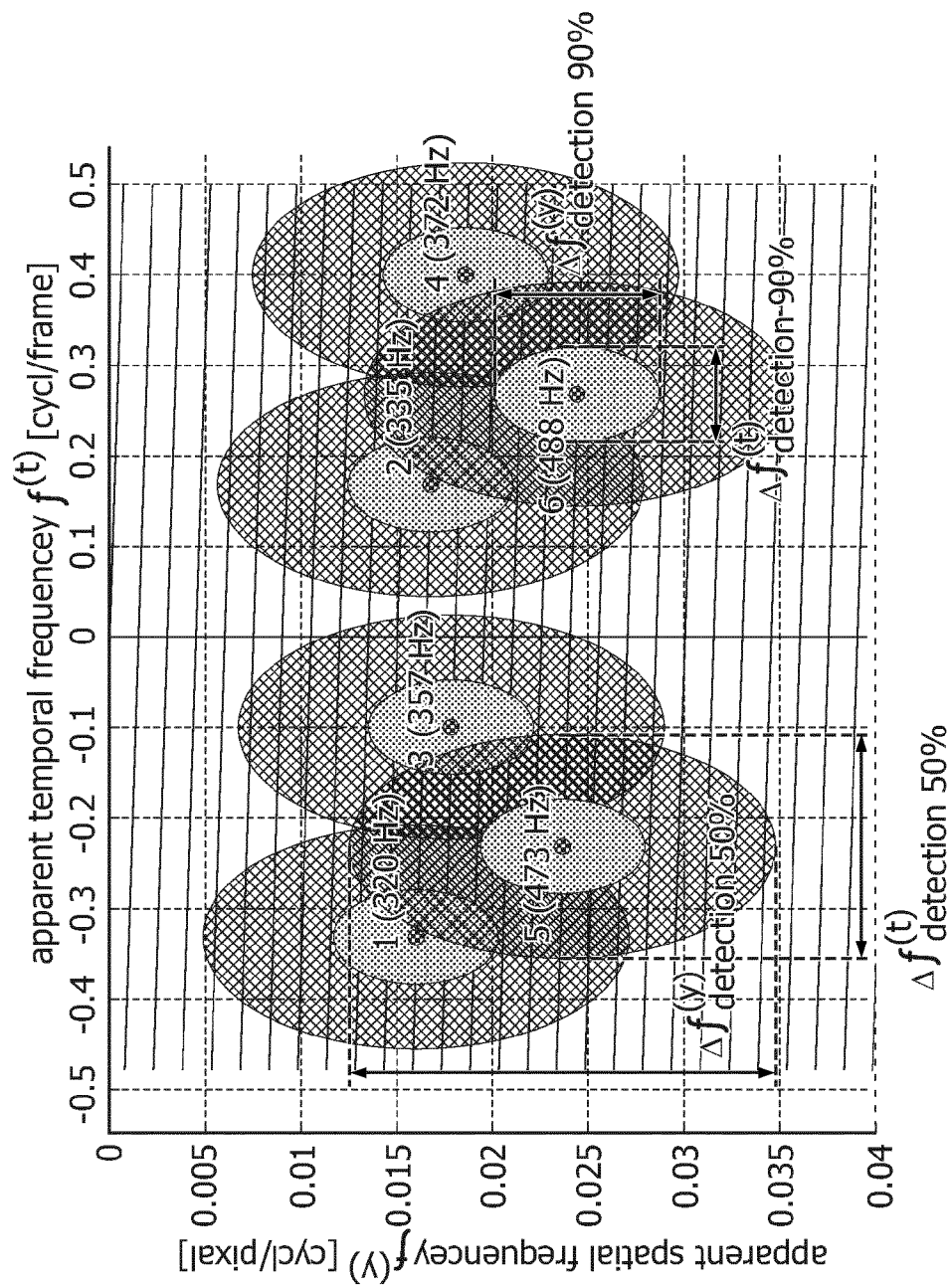
FIG. 9 shows an example channel topology of a frequency allocation scheme.

Such definition of spatiotemporal detection bands enables the composition of a topology of spatiotemporal detection channels. An example of such a topology is shown in FIG. 9 this gives an example detection channel topology based on $f_{frame}$=30 Hz, $f_{line}$=20 kHz and $N_{frames}$=5 frames as a basis for estimation. The length of the spatial Gabor filter is 101 taps.

The present disclosure is based on the observation that for small numbers of frames, the temporal-frequency detection selectivity may be poor but exhibits distinct zeros for particular frequencies.

Figure 10:
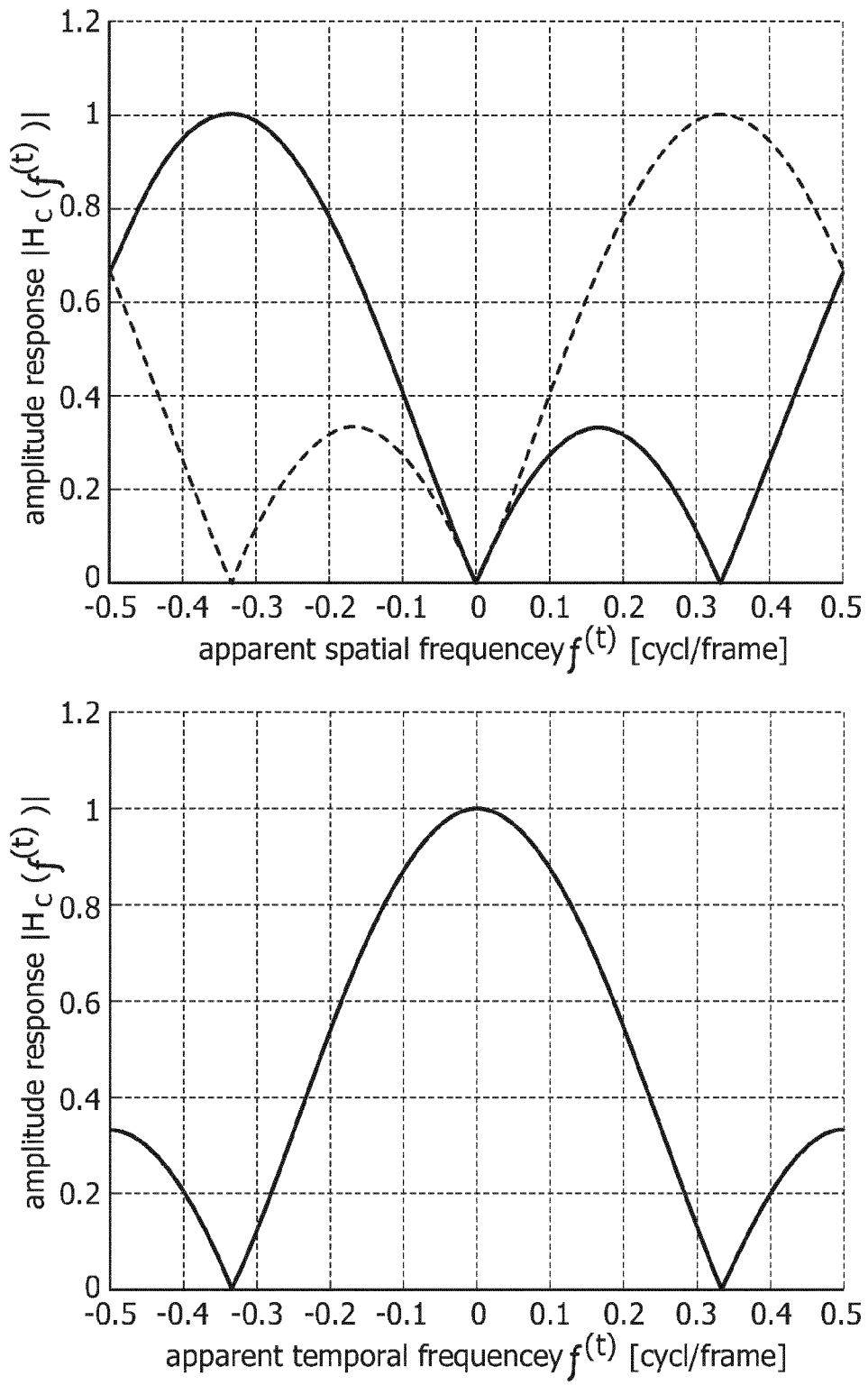
FIG. 10 shows further examples of the magnitude response of a detection module.

It is an aim to select physical modulation frequencies $f_c$ [Hz], such that the associated apparent temporal frequencies $f_c^{(t)}$ [cycles/frame] provide an optimal suppression of other modulation frequencies as well as optimal suppression of the static background in the captured video. This can be illustrated graphically. In FIG. 10, the temporal frequency response is calculated when only 3 frames are used in the detection of the lamp footprint. The graphs follow from expression (16), using and the modulation frequencies have been chosen such that each peak in a detection band response coincides with a zero in the other band responses, including to DC, i.e. $f^{(t)}$=0 cycles/frame.

The top of FIG. 10 shows the magnitude response of detection bands as a function of apparent temporal frequency $f^{(t)}$ for a frame count $N_{frames}$=3 for an optimal choice of modulation frequencies. The bottom shows the magnitude response associated with a temporal average over 3 frames.

The bands then should then be centered around the apparent temporal frequencies:

$$f_c^{(t)}=-\tfrac{1}{3} \text{ [cycles/frame], and}$$

$$f_c^{(t)}=\tfrac{1}{3} \text{ [cycles/frame].} \quad (19)$$

Due to aliasing around $f_{frame}$, there are multiple physical modulation frequencies that maps to the same apparent temporal frequencies:

$$f_c=(k-\tfrac{1}{3})f_{frame} \text{ [Hz], and}$$

$$f_c=(k+\tfrac{1}{3})f_{frame} \text{ [Hz]} \quad (20)$$

respectively for k=1, 2, 3, . . . . Any physical frequency for which $f=k\cdot f_{frame}$ [Hz] maps to DC, so $f^{(t)}$=0 cycles/frame. The associated magnitude response in FIG. 10 has zeros at $f_c^{(t)}$=+/−⅓ [cycles/frame] such that the temporal frame average is totally free from the modulations caused by the coded light sources.

In this case, there are two apparent temporal frequencies that lead to a situation that is regarded 'optimal' in the context of this example:

Any response that optimally detects around an apparent temporal frequency $f_c^{(t)}$ exhibits a zero at any other apparent temporal frequency $f_{c'}^{(t)}$ where c'≠c. (In the example above, the band for detection of $f_c^{(t)}$=−⅓ [cycles/frame] 'peaks' at −⅓ [cycles per frame] and has a zero at +⅓ [cycles/frame], so at $f_{c'}^{(t)}$).

Any response that optimally detects around an apparent temporal frequency $f_c^{(t)}$ exhibits a zero at the apparent temporal frequency $f^{(t)}$=0, which is associated with the static background in the video frame.

Figure 11:
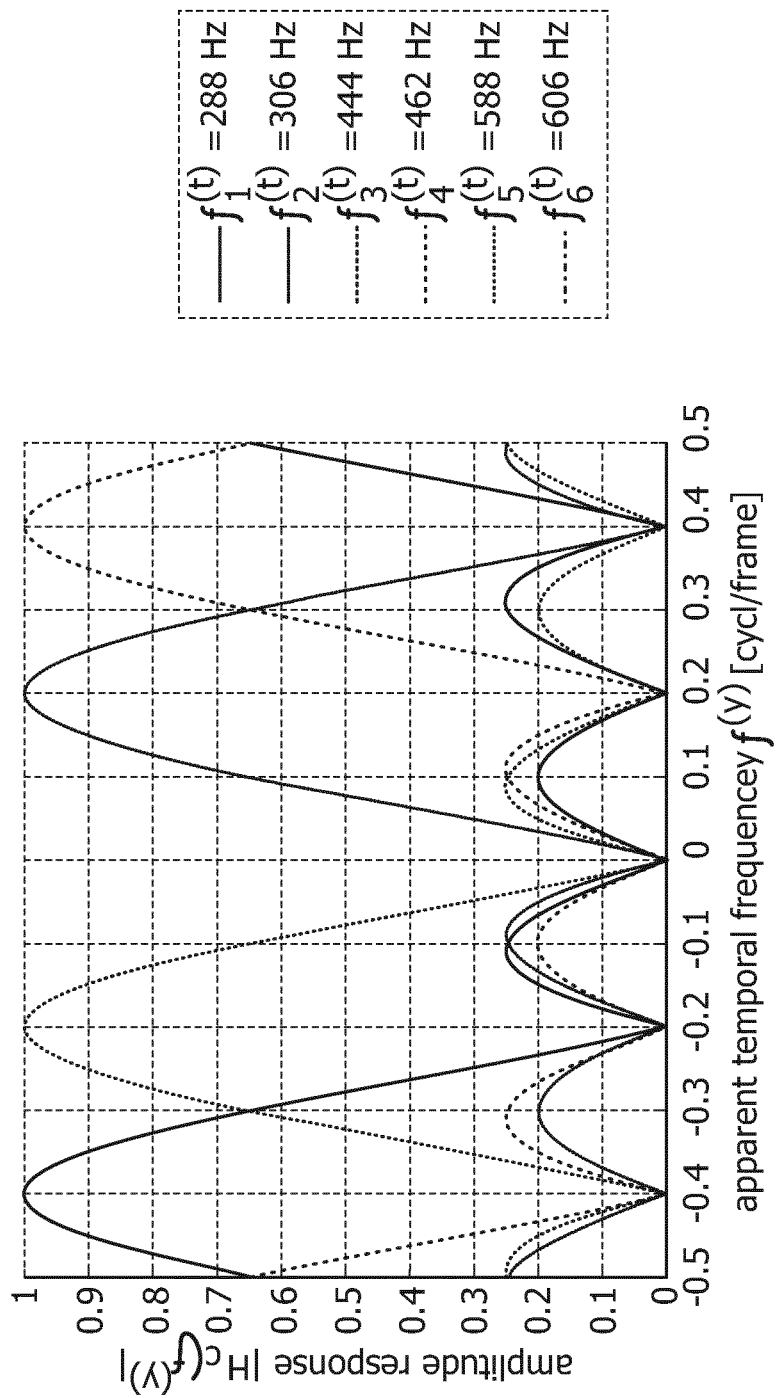
FIG. 11 shows another example response of a detection module

FIG. 11 shows magnitude response as a function of apparent temporal frequency $f^{(t)}$ for a frame count $N_{frames}$=5 for an optimal selection of frequencies. Here, is chosen such that the apparent temporal frequencies are confined to $f_c^{(t)}$=−⅖, −⅕, ⅕ or ⅖. In comparison with the frequency allocation in FIG. 8, some curves are not visible as they map to the same apparent temporal frequency. The curve with the leftmost peak has $f_1^{(t)}$=320 Hz. The curve with the next leftmost peak has $f_3^{(t)}$=357 Hz. The curve with the second peak from the right has $f_2^{(t)}$=335 Hz. The curve with the rightmost peak has $f_4^{(t)}$=372 Hz.

Figure 12:
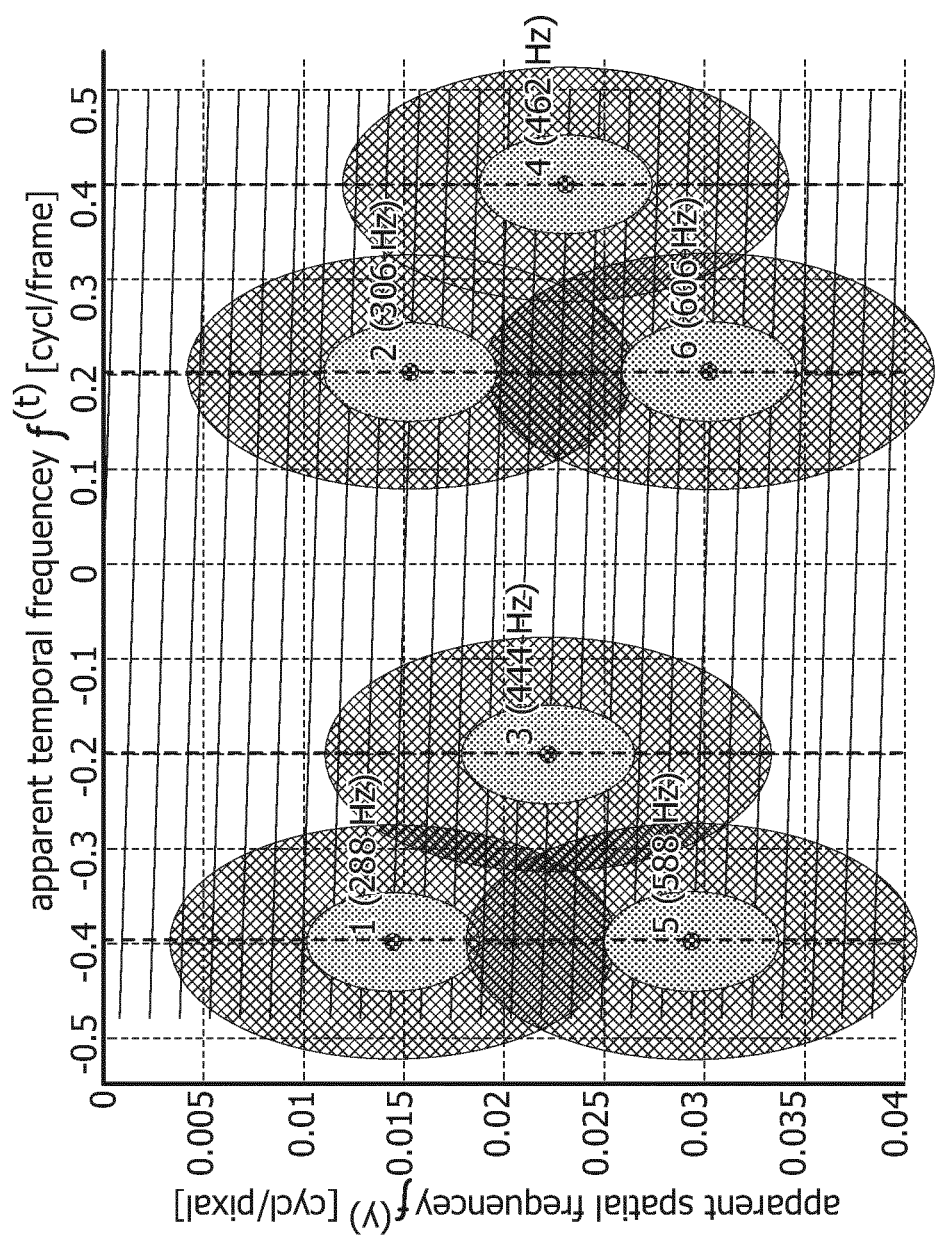
FIG. 12 shows another example channel topology.

FIG. 12 shows an example magnitude response as a function of apparent spatial and temporal frequencies ($f^{(y)}$, $f^{(t)}$) for a frame count $N_{frames}$=5 for an optimal selection of frequencies. Here, $f_c$ is chosen such that the apparent temporal frequencies are confined to $f_c^{(t)}$=−⅖, −⅕, ⅕ or ⅖. The dashed vertical lines indicate the location of optimal frequencies in case 5 frames are used for signal detection.

The advantage of the described scheme is that it offers the best possible channel separation in lamp signal detection given a number of frames. Even for a small number of frames an optimal channel separation and an optimal background suppression can be achieved. In embodiments this is particularly advantageous in case a lamp signal modulation is varied in frequency such as used in frequency shift keying (FSK). Fast detection allows fast frequency switching, such that higher transmission bitrates can be achieved.

The present disclosure describes the selection of lamp modulation frequencies, such that for a given odd number of frames N at a given frame rate, an optimal signal detection is achieved. In the examples illustrated above, the optimal modulation frequencies then are to be selected such that:

$$f_c = \frac{k}{N} f_{frame} [\text{Hz}],$$

for any k=1, 2, 3, . . . which is not an integer multiple of N. (21)

Figure 13A:
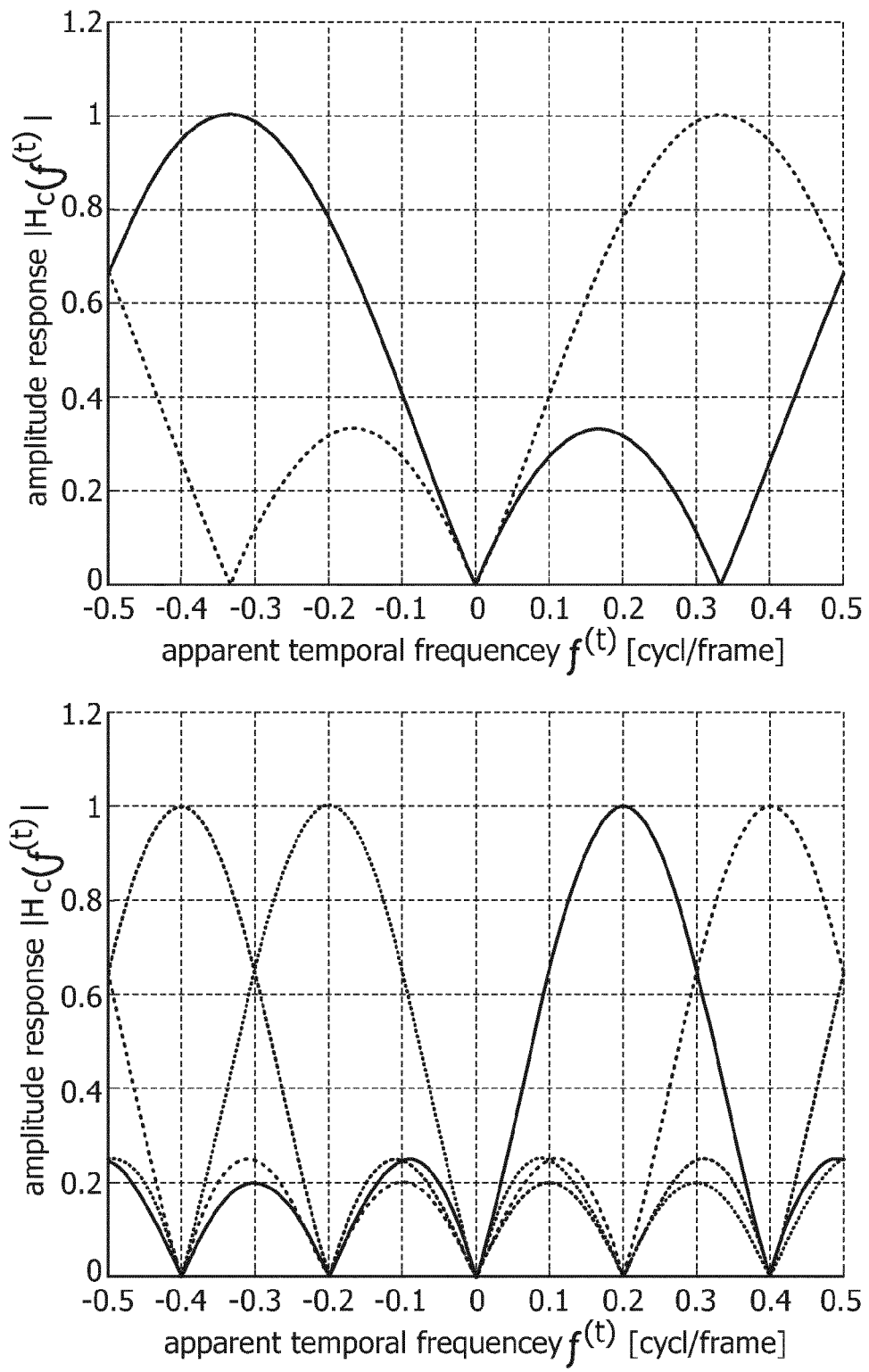
FIGS. 13a-13b show yet further examples of the detection module response.
Figure 13B:
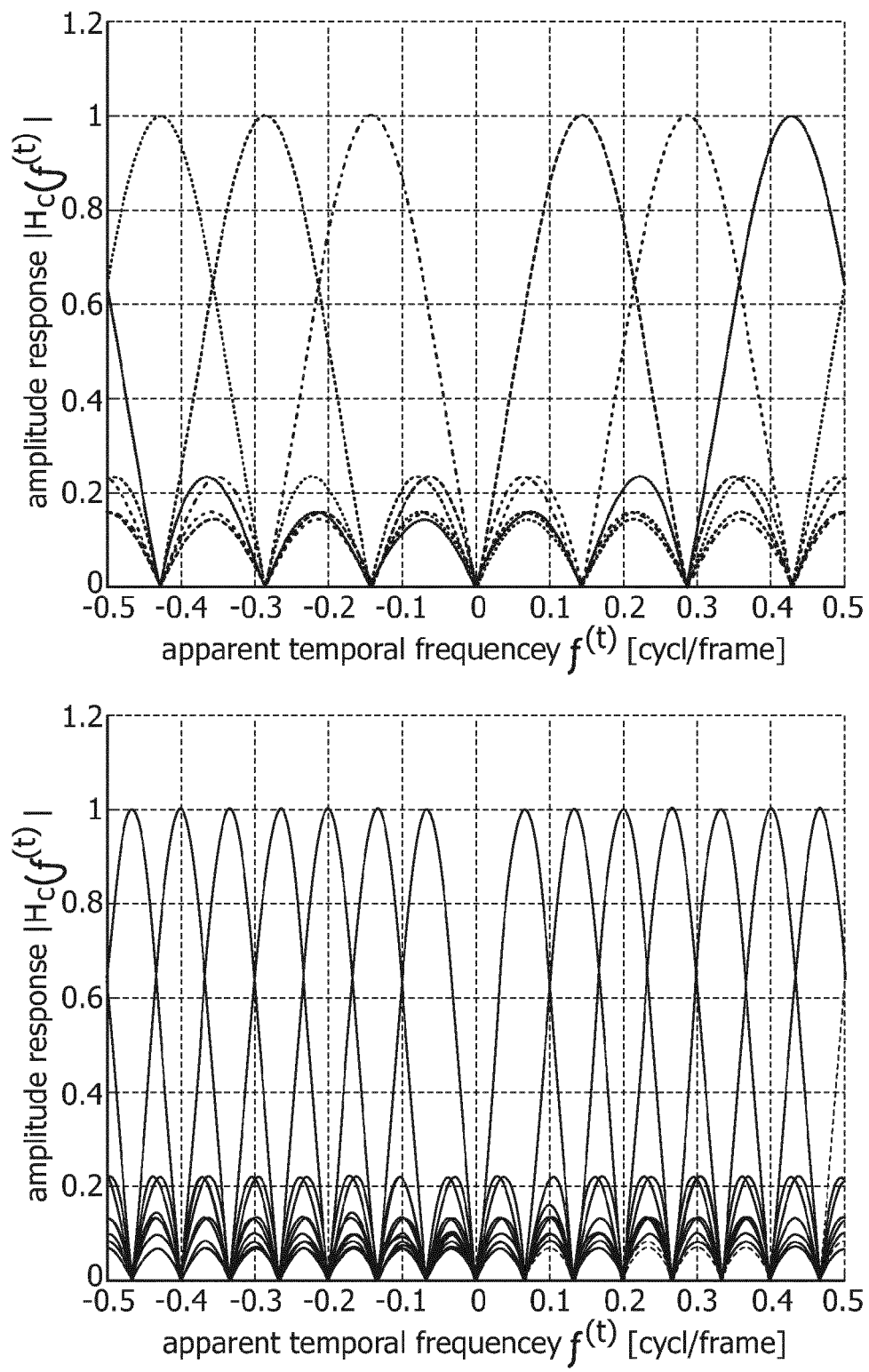

In FIG. 13, the magnitude responses are depicted for various numbers of frames. FIG. 12 shows magnitude responses for detection bands in case 3, 5, 7 and 15 frames are used as a basis for frequency detection on the basis of optimal frequency selection according to 'design rule' (21).

In other embodiments a single light source can produce a signal that contains multiple frequencies in temporal sequence or simultaneously, such that at least one (if not all) of these frequencies is 'optimal'.

In other embodiments a single light source can produce a packet stream such that one or more harmonic frequency components coincide with said optimal frequencies.

In further embodiments the lamp signal detection on the basis of consecutive frames, as well as the background extraction, can be repeated after every new frame such that a first estimate uses frames 1, 2, 3, . . . N and the new estimate take place using frames 2, 3, 4, . . . N+1. Thus, after the first N frames, the detection provides a new lamp-signal amplitude estimate each new frame. Such fast estimates enable a real time visualization of the individual light footprints on the display connected with the camera device.

In further embodiments the detection of frames 2, 3, 4, . . . N+1 takes place after removing the contribution of frame 1 from the amplitude estimates and incorporation of frame N+1 to form a new set of amplitude estimates. This is possible if that removal and incorporation are based on phase-compensated subtraction of the discarded frame data and phase-compensated addition of the new frame data respectively. The phase is determined by the lamp frequency of interest and on the associated temporal frame index.

In further embodiments, lamp frequencies may be confined to a limited set of values (e.g. only integer values). The chosen lamp frequency can be chosen as the closest value.

In the case of integer lamp frequencies this would mean rounding to the nearest integer.

In other embodiments the selection of mentioned 'optimal' frequencies can be combined in combinations with other selection criteria. (This is implicitly applied in the topology depicted in FIG. 12, where the temporal- and spatial-frequency selectivity combine to an elliptical subband shape. The optimal packing of ellipses would require the placement of the frequencies on an hexagonal grid.) The exposure time also causes selective attenuation of frequencies; knowledge of the exposure time can also be combined in the selection of a final set of frequencies.

In embodiments, the disclosed scheme can be used for camera based detection of coded light for installation and commissioning of lighting systems as well as for lighting control. For example, the disclosed scheme can enable coded light detection with a normal smartphone or tablet computer's camera.

It will be appreciated that the embodiments above have been described only by way of example.

For example, while the above has been exemplified in terms of a detection module with a certain response, in other implementations with different but similar responses the disclosed set of modulation frequencies may still provide the property that the apparent temporal frequency of one channel falls substantially at the blind spot of another channel. Or alternatively, this principle may be extended to detection processes with other responses if the blind spots are known or can be determined.

In one alternative, the camera may be a global shutter camera whereby each frame is exposed at once (rather than line-by-line as in a rolling shutter camera). WO 2011/086501 explains how a global shutter camera can be used to detect coded light components modulated at different modulation frequencies. The detection relies on aliasing, which will limit the number of suitable frequency sets. A given channel will have a certain response in the temporal frequency domain. The frequencies may be chosen according to the principle of the present disclosure with the response of one channel falling in the blind spot of another's frequency response curve.

Further, it is noted that the channels need only fall substantially in one another's' blind spots and the modulation frequencies need only be considered substantially optimal. I.e. the channels may have some overlap but to the extent that the interfering effect between them is negligible. Further, where it has been said that the modulation frequencies are selected from amongst a predetermined set, this does not necessarily excluded there being other components present in the environment with other modulation frequencies which do not conform to the set.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Transmitting apparatus comprising:
a controller configured to output a signal for controlling a light source to emit light;
wherein said controller is configured, via said signal, to modulate a coded light component into the light, the modulation in the light causing a video image captured by a receiving camera from said light to experience an apparent temporal frequency due to sequential capture of multiple frames of said video image and an apparent spatial frequency due to sequential exposure of spatial portions within each frame;
wherein said controller is configured to modulate the coded light component into the light on a selected one of a plurality of different modulation frequencies, each different modulation frequency defining a respective channel, and each of the channels to be detected by a detection module of the camera based on a respective combination of values of the apparent temporal frequency and apparent spatial frequency corresponding to the respective modulation frequency, the detection module having a respective response on each of the channels that varies as a function of the apparent temporal frequency; and
wherein the controller is configured with said one of the channels being selected from amongst a predetermined set of said channels, the predetermined set of said channels having a property that the response of the detection module on each of said predetermined set of said channels has minimum substantially at the apparent temporal frequency of each other of said predetermined set of said channels.

2. The apparatus of claim 1, comprising:
one or more controllers including at least said controller, said one or more controllers configured to output signals for controlling a plurality of lighting sources including said signal for controlling said light source; and
wherein said one or more controllers, are configured, via said signals, to modulate a respective coded light component into the light emitted from each of the light sources, each on a respective one of the predetermined set of channels each having a different respective modulation frequency.

3. The apparatus of claim 1, wherein:
the controller is configured to modulate a plurality of coded light component into the light emitted from said light source, each on a respective one of the predetermined set of channels each having a different respective modulation frequency.

4. The apparatus of claim 1, wherein the response of the detection module is dependent on a number of the sequentially captured frames over which the coded light component is detected, and the predetermined set is arranged to have said property for said number of frames.

5. The apparatus of claim 4, wherein the modulation frequencies of the predetermined set are configured substantially as:

$$f_c = \frac{k}{N} f_{frame}$$

where $f_c$ is the modulation frequency, $f_{frame}$ is a rate at which the frames are captured, N is the number of sequentially captured frames over which the coded light component is to be detected, and k is an integer other than N.

6. The apparatus of claim 1, wherein the response has a width $\Delta f_c^{(y)}$ in the domain of the apparent spatial frequency and a width $\Delta f_c^{(t)}$ in the domain of the apparent temporal frequency, and the modulation frequency on each channel is separated from each other channel by at least $\Delta f_c^{(y)}$ in the apparent spatial frequency domain and $\Delta f_c^{(t)}$ in the apparent temporal frequency domain.

7. A receiving device, comprising:
an input for receiving video image data from a camera, wherein modulation in light emitted by a light source will cause a video image captured by the camera from said light to experience an apparent temporal frequency due to sequential capture of multiple frames of said video image; and
a detection module configured to detect coded light components modulated into the light on a plurality of respective channels each having a different respective modulation frequency, being configured to separate out each of the channels based on the apparent temporal frequency;
wherein on each of said channels, the detection module has a respective response that varies as a function of the apparent temporal frequency; and
the response of the detection module on each of said channels has a minimum substantially at the apparent temporal frequency of each other of said channels.

8. The device of claim 7, wherein modulation in the light will cause the camera to experience an apparent spatial frequency due to sequential exposure of spatial portions within each frame; and
the detection module is configured to selectively receive each of the channels based on a respective combination of values of the apparent temporal and spatial frequency corresponding to the respective modulation frequency;
wherein on each of said channels, the response of the detection module comprises an effect of the selective reception based on the apparent spatial frequency.

9. The device of claim 8, wherein the camera is a rolling shutter camera, the spatial portions being lines of the frame.

10. The device of claim 7, wherein the response of the detection module is dependent on a number N of the sequentially captured frames over which the coded light component is detected, and the modulation frequencies of the predetermined set are configured substantially as:

$$f_c = \frac{k}{N} f_{frame}$$

where $f_c$ is the modulation frequency, $f_{frame}$ is a rate at which the frames are captured, and k is an integer other than N.

11. The device of claim 8, wherein the detection module comprises a filter configured to select the apparent spatial frequency of the channel, and a temporal accumulation function arranged to select the apparent temporal frequency; where the response comprises an effect of the filter and the temporal accumulation function.

12. The device of claim 11, wherein said filter comprises a Gabor filter $z_c(y,n)$ and the temporal accumulation function is described by:

$$a_c = |\Sigma_{n=1}^N z_c(y,n) e^{-i2\pi f_c^{(t)}(n-1)}|$$

where $f_c^{(t)}$ is the apparent temporal frequency and N is the number of sequentially captured frames over which the coded light component is to be detected.

13. The device of claim 7, wherein the detection module is configured to detect the coded light component over a first group of N of said sequentially captured frames, and then to perform an updated instance of the detection over each of one or more further groups N of said sequentially captured frames, where the groups overlap in time, containing some of the same frames.

14. The device of claim 7, wherein the camera is a global shutter camera.

15. The apparatus of claim 1, wherein the one of the channels selected from amongst the plurality of the predetermined set of said channels and defined by the selected one of the plurality of different modulation frequencies is a first channel, and wherein the controller is configured to control the light source to modulate a second coded light component into the light on a second one of said plurality of different modulation frequencies defining a second channel, different from the first channel, of the predetermined set of said channels.

16. The apparatus of claim 1, wherein the one of the channels selected from amongst the plurality of the predetermined set of said channels and defined by the selected one of the plurality of different modulation frequencies is a first channel, and wherein the controller or at least one other controller included in the transmitting apparatus is configured to control a second light source to modulate a second coded light component into light emitted by the second light source on a second one of said plurality of different modulation frequencies defining a second channel, different from the first channel, of the predetermined set of said channels.

17. A communication system comprising:
a receiving device including a camera and a detection module; and
a transmitting apparatus including:
a light source, and
a controller configured to output a signal for controlling the light source to emit light;
wherein said controller is configured, via said signal, to modulate a coded light component into the light, the modulation in the light causing a video image captured by said camera from said light to experience an apparent temporal frequency due to sequential capture of multiple frames of said video image and an apparent spatial frequency due to sequential exposure of spatial portions within each frame;
wherein said controller is configured to modulate the coded light component into the light on a selected one of a plurality of different modulation frequencies, each different modulation frequency defining a respective channel, and each of the channels is detected by the detection module based on a respective combination of values of the apparent temporal frequency and apparent spatial frequency corresponding to the respective modulation frequency, the detection module having a respective response on each of the channels that varies as a function of the apparent temporal frequency; and
wherein the controller is configured with said one of the channels being selected from amongst a predetermined set of said channels, the predetermined set of said channels having a property that the response of the detection module on each of said predetermined set of said channels has a minimum substantially at the apparent temporal frequency of each other of said predetermined set of said channels.

18. The system of claim 17, wherein the one of the channels selected from amongst the plurality of the predetermined set of said channels and defined by the selected one of the plurality of different modulation frequencies is a first channel, and wherein the controller is configured to control the light source to modulate a second coded light component into the light on a second one of said plurality of different modulation frequencies defining a second channel, different from the first channel, of the predetermined set of said channels.

19. The system of claim 17, wherein the one of the channels selected from amongst the plurality of the predetermined set of said channels and defined by the selected one of the plurality of different modulation frequencies is a first channel, and wherein the controller or at least one other controller included in the transmitting apparatus is configured to control a second light source included in said transmitting apparatus to modulate a second coded light component into light emitted by the second light source on a second one of said plurality of different modulation frequencies defining a second channel, different from the first channel, of the predetermined set of said channels.

* * * * *